US012729906B2

(12) United States Patent
D'Epiro

(10) Patent No.: US 12,729,906 B2
(45) Date of Patent: Sep. 8, 2026

(54) METHOD AND A RELATIVE APPARATUS FOR PRODUCING LIQUIFIED GASES

(71) Applicant: FPT INDUSTRIAL S.P.A., Turin (IT)

(72) Inventor: Clino D'Epiro, Alpignano (IT)

(73) Assignee: FPT INDUSTRIAL S.P.A., Turin (IT)

( * ) Notice: Subject to any disclaimer, the term of this patent is extended or adjusted under 35 U.S.C. 154(b) by 199 days.

(21) Appl. No.: 17/786,842

(22) PCT Filed: Dec. 14, 2020

(86) PCT No.: PCT/IB2020/061878
§ 371 (c)(1),
(2) Date: Jun. 17, 2022

(87) PCT Pub. No.: WO2021/124062
PCT Pub. Date: Jun. 24, 2021

(65) Prior Publication Data

US 2023/0031323 A1 Feb. 2, 2023

(30) Foreign Application Priority Data

Dec. 20, 2019 (IT) ........................ 102019000025078

(51) Int. Cl.
*F25J 1/02* (2006.01)
*F02B 33/06* (2006.01)
(Continued)

(52) U.S. Cl.
CPC ............. *F25J 1/0275* (2013.01); *F02B 33/06* (2013.01); *F02D 41/0005* (2013.01);
(Continued)

(58) Field of Classification Search
CPC ........ F25J 1/0275; F25J 1/0012; F25J 1/0015; F25J 1/004; F25J 2210/40; F25J 2210/42;
(Continued)

(56) References Cited

U.S. PATENT DOCUMENTS 4,285,709 A * 8/1981 Gram ................. B01D 53/0407 62/636
4,498,484 A 2/1985 Petrovsky et al.
(Continued)

FOREIGN PATENT DOCUMENTS

DE 102008008721 A1 8/2009
FR 2875265 A1 3/2006
(Continued)

OTHER PUBLICATIONS

WO-2015036624-A1 English Translation (Year: 2015).*
(Continued)

*Primary Examiner* — Frantz F Jules
*Assistant Examiner* — Devon Moore
(74) *Attorney, Agent, or Firm* — Leason Ellis LLP

(57) ABSTRACT

A method for producing liquefied gases includes providing an internal combustion engine with at least one cylinder and an exhaust manifold, providing a flow circuit, which includes the cylinder and connects an air inlet to the exhaust manifold, conveying air along the flow circuit according to a flow direction from the air inlet towards the exhaust manifold, compressing the air along a portion of the flow circuit, and liquefying at least one gaseous component of the compressed air.

9 Claims, 5 Drawing Sheets

(51) Int. Cl.

| | |
|---|---|
| ***F02D 41/00*** | (2006.01) |
| ***F02M 33/00*** | (2006.01) |
| ***F02M 35/10*** | (2006.01) |
| ***F25J 1/00*** | (2006.01) |

(52) U.S. Cl.
CPC ...... *F02M 33/00* (2013.01); *F02M 35/10229* (2013.01); *F25J 1/0012* (2013.01); *F25J 1/0251* (2013.01); *F25J 1/0015* (2013.01); *F25J 1/004* (2013.01); *F25J 2210/06* (2013.01); *F25J 2210/40* (2013.01); *F25J 2230/22* (2013.01); *F25J 2230/30* (2013.01); *F25J 2230/40* (2013.01); *F25J 2240/42* (2013.01)

(58) Field of Classification Search
CPC .. F25J 2230/30; F25J 2230/40; F25J 2230/42; F25J 2215/80; F25B 2327/001
See application file for complete search history.

(56) References Cited

U.S. PATENT DOCUMENTS

| | | | | |
|---|---|---|---|---|
| 6,543,225 | B2 * | 4/2003 | Scuderi | F02B 75/228<br>123/53.1 |
| 6,952,923 | B2 * | 10/2005 | Branyon | F02B 33/44<br>123/70 R |
| 7,353,786 | B2 * | 4/2008 | Scuderi | F02B 21/00<br>123/53.5 |
| 7,854,278 | B2 | 12/2010 | Kaufman | |
| 8,763,571 | B2 | 7/2014 | Gilbert et al. | |
| 9,396,854 | B2 * | 7/2016 | Geers | H01F 27/2895 |
| 9,528,758 | B2 * | 12/2016 | Nilsen | F25J 1/0278 |
| 2014/0261328 | A1 | 9/2014 | Mcalister | |

FOREIGN PATENT DOCUMENTS

| | | | | |
|---|---|---|---|---|
| WO | WO-2010067080 A1 | * | 6/2010 | F02B 41/06 |
| WO | WO-2015036624 A1 | * | 3/2015 | B01D 53/002 |

OTHER PUBLICATIONS

International Search Report and Written Opinion in PCT Application No. PCT/IB2020/061878, mailed Mar. 19, 2021.
Italian Search Report and Written Opinion in PCT Application No. PCT/IB2020/061878, mailed Jul. 21, 2020.

* cited by examiner

METHOD AND A RELATIVE APPARATUS FOR PRODUCING LIQUIFIED GASES

CROSS-REFERENCE TO RELATED APPLICATIONS

This Patent Application is a U.S. National Phase Application under 35 U.S.C. § 371 of International Patent Application No. PCT/IB2020/061878, filed on Dec. 14, 2020, which claims priority from Italian Patent Application No. 102019000025078 filed on Dec. 20, 2019, the entire disclosure of which is incorporated herein by reference.

TECHNICAL FIELD

The invention relates to a method for producing liquefied gases and to a relative apparatus for producing liquefied gases, which, in particular, can be installed in a vehicle.

KNOWN STATE OF THE ART

Methods and apparatuses for the production of liquefied gases are generally known for the purpose of obtaining significant quantities of technical gases, such as He, Ne, Ar, N2, O2 or even air as a whole, and, furthermore, said liquefied gases can be used as energy reserve that can be stored in particularly small spaces.

Indeed, liquefied products, which would be available in a gaseous state at ambient temperature and pressure, can advantageously be used for the production of work through their compression, evaporation and expansion.

At the same time, liquefied products have a significantly smaller specific volume compared to when they are in the gaseous state, even if they are compressed at relatively high pressures.

Normally, the liquefaction of a compressed gas, for example compressed by means of a compressor, is obtained through Joule Thomson effect by b means of an isenthalpic expansion of the compressed gas in a thermal expansion valve.

Prior to being expanded in the thermal expansion valve, the compressed gas flowing out of the compressor is usually cooled in an isobaric manner causing it flow, for example, through a heat exchanger, where the compressed gas release heat to a non-liquefied portion of the gas, which is expanded in the thermal expansion valve and is properly redirected through the heat exchanger.

In some cases, part of the compressed gas flowing out of the compressor is caused to separately expand in a turbine, so as to recover the pressure energy thereof, and then redirected through the heat exchanger together with the non-liquefied portion coming from the thermal expansion valve.

The expanded gas, which receives heat from the compressed gas, can finally be delivered to the inlet of the compressor, so that a so-called reversed Brayton-Joule cycle can be carried out in a complete manner.

In general, liquefied gases need to be produced in such a way that the kinetic energy of the vehicle, which would otherwise be lost, can be used, improving, compared to the prior art, in particular with a greater efficiency, the consumptions of the vehicle.

The object of the invention is to fulfil the need discussed above.

SUMMARY OF THE INVENTION

The aforesaid object is reached by a means of a method and a relative apparatus for producing liquefied gases according to the appended claims.

The dependent claims define special embodiments of the invention.

BRIEF DESCRIPTION OF THE DRAWINGS

The invention will be best understood upon perusal of the following description of some embodiments, which are provided by mere way of non-limiting example, with reference to the accompanying drawings, wherein.

DETAILED DESCRIPTION OF THE INVENTION

Figure 1:
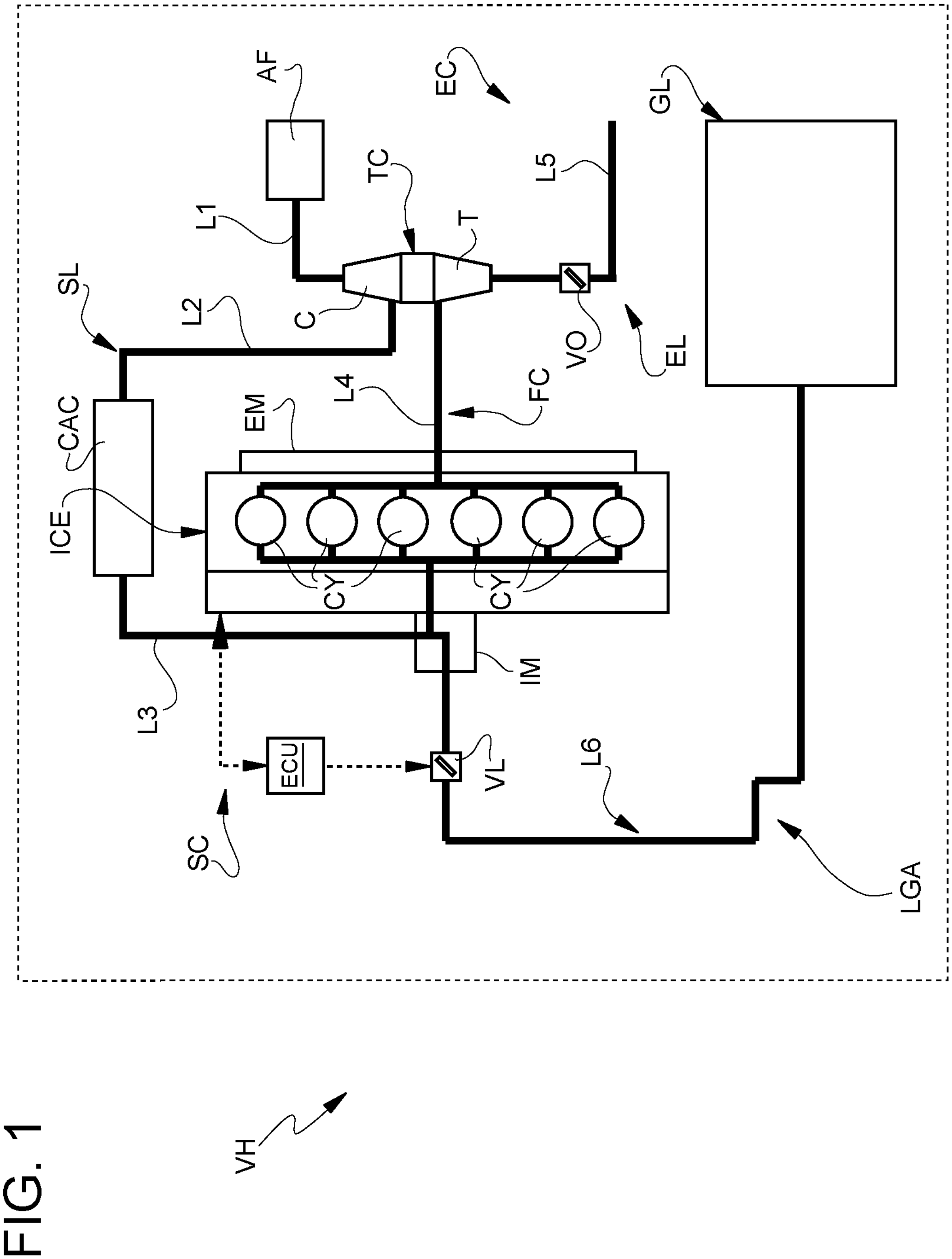
FIG. 1 is a diagram of a vehicle comprising a first embodiment of an apparatus for producing liquefied gases according to the invention.

With reference to FIG. 1, reference symbol VH indicates, as a whole, a vehicle, whose components are partly shown in a schematic manner.

More in detail, the vehicle VH comprises:

- an internal combustion engine ICE;
- a turbocharger TC to supercharge the engine ICE;
- an air filter AF, through which the turbocharger TC sucks air;
- a heat exchanger CAC to cool the air compressed by the turbocharger TC;

The engine ICE specifically is a compression release engine, so that it is adapted to burn a mixture of air and Diesel fuel.

The engine ICE comprises a plurality of cylinders CY, an intake manifold IM as well as an exhaust manifold EM.

In the operation of the engine ICE, the cylinders CY suck, from the intake manifold IM, a finite volume of air, which is compressed inside the cylinders CY and mixed with drops of fuel injected therein. Hence, the combustion and the expansion of the mixture take place in a spontaneous manner inside the cylinders CY. When the expansion of the mixture is complete, the exhaust manifold EM receives the burnt gases from the cylinders CY.

The turbocharger TC is a turbomachine comprising compressor portion C, which is adapted to receive air to be compressed, specifically from the air filter AF, and a turbine portion T, which is adapted to expand the exhaust gases from the exhaust manifold EM with a production of work to be used by the compressor portion C.

The heat exchanger CAC, also known as inter-refrigerator in technical language, is configured to bring the air compressed by the compressor portion C in thermal contact with a refrigerant fluid, for example air or water, at a lower temperature than the one of the compressed air.

In order to lead air from the air filter AF to the intake manifold IM, the vehicle VH comprises a supply line SL, which connects the air filter AF, the compressor portion C, the heat exchanger CAC and the intake manifold IM to one another in series.

In particular, the supply line SL includes:

a first duct 11, which connects an outlet of the air filter AF to an inlet of the compressor portion C;

a second duct 12, which connects an outlet of the compressor portion C to a compressed air inlet of the heat exchanger CAC; and a third duct 13, which connects a compressed air outlet of the heat exchanger to the intake manifold IM.

Therefore, the Compressor portion C and the heat exchanger CAC build, together with the supply line SL, part of a supply circuit SC for the engine ICE, namely a circuit to supply the engine ICE with air, specifically pre-compressed air.

In order to release exhaust gases into the atmosphere, the vehicle VH further comprises an exhaust line EL, which connects the exhaust manifold EM to an exhaust (not shown), in direct contact with the atmosphere, through the turbine portion T.

In particular, the exhaust line EL comprises a fourth and a fifth duct L4, L5, which connect the exhaust manifold EM to an inlet of the turbine portion T and an outlet of the turbine portion T to the exhaust, respectively.

Therefore, the exhaust line EL and the turbine portion T are part of an exhaust circuit EC for the engine ICE, namely a circuit to release the exhaust gases of the engine ICE into the atmosphere.

Hence, the supply circuit SC, the exhaust circuit EC, the intake and exhaust manifolds IM, EM and the cylinders CY help define a flow circuit FC, which connects an air inlet, specifically defined by the outlet of the air filter AF, to the exhaust manifold EM.

Advantageously, the vehicle VH further comprises an apparatus for producing liquefied gases LGA, which includes the engine ICE, the flow circuit FC and a gas liquefaction assembly GL, which is adapted to receive compressed air and to liquefy at least a component thereof, for example nitrogen or the air itself.

Furthermore, in order to supply the assembly GL, the apparatus LGA comprises a further supply line L6, which joins the flow circuit FC at a point downstream of the turbocharger TC, conveniently between the heat exchanger CAC and the intake manifold IM, the latter being included as shown in FIG. 1.

The supply line L6 has, in particular, one single supply duct for the assembly GL. Preferably, the supply line L6 further comprises a flow regulation device VL, which can be controlled so as to enable or forbid gas flows along the supply duct supplying the assembly GL, namely towards the assembly GL from the flow circuit FL.

More precisely, the flow regulation device VL comprises a valve, specifically an on-off valve, placed along the supply duct supplying the assembly GL. Alternatively, the device VL could comprise a three-way valve at the junction between the supply line L6 and the flow circuit FC.

In addition, the apparatus LGA comprises a control unit ECU, for example the electronic control unit of the vehicle VH, which is connected to the device VL in order to control it. Specifically, the control unit ECU is programmed so as to control the device VL to enable a compressed air flow towards the assembly GL when the engine ICE operates under engine brake conditions.

Indeed, under engine brake conditions, the engine ICE does not need to be supercharged, whereas the pressure of the air flowing out of the compressor portion C can be useful for the assembly GL in order to liquefy at least a component of the air itself.

The control unit ECU is configured to identify the occurrence of an engine brake condition arising in a natural manner, for example when the vehicle VH runs along a long downhill road or during a gear downshift, and/or to actively force the engine ICE to operate under said engine brake conditions. In the last case, the exhaust line EL conveniently comprises a shutter valve VO, which is arranged in the duct 15 and is controlled by the control unit ECU so as to at least partially close the duct L5. The shutter valve VO is usually activated after the turbine portion T has reached its maximum rotation speed, so as to improve the engine brake condition. In other words, the shutter valve VO can be controlled by means of the control unit ECU so as to adjust the gas flow towards the exhaust.

During the engine brake condition, the control unit ECU further is conveniently programmed to inhibit the injection of fuel into the cylinders CY.

Figure 4:
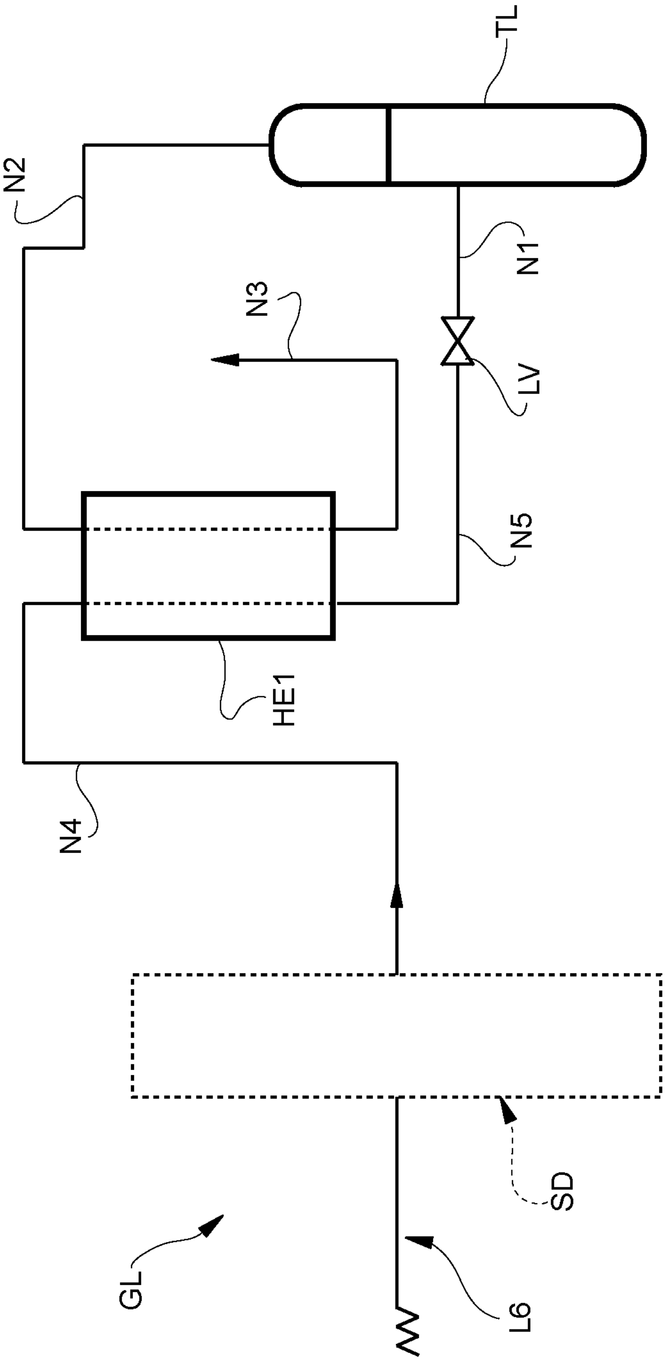
FIG. 4 shows, more in detail, a diagram of a gas liquefaction assembly of the embodiments shown in the preceding figures.

FIG. 4 shows more in detail a merely explanatory and non-limiting example of a possible construction of the liquefaction assembly GL suitable for liquefying a component of the compressed air with which it is supplied.

In the example of FIG. 4, the liquefaction assembly GL comprises a thermal expansion valve LV to expand the component of the compressed air, in particular in an isenthalpic manner, and, preferably, a cooling device HE1 to cool the component before the expansion.

In this specific case, the cooling device HEL is a heat exchanger, which creates a thermal contact between the component to be expanded and the same component expanded through the thermal expansion valve LV and still in the gaseous state.

Indeed, when the component expands through the thermal expansion valve LV, a part of the component liquefies due to a Joule-Thomson effect, whereas a remaining part remains in the gaseous state, though at even a lower temperature compared to the temperature at the inlet of the thermal expansion valve LV.

The assembly GL comprises a separation device to separate the liquefied part from the gaseous part; in particular, the separation device comprises a tank TL, which is connected to the outlet of the thermal expansion valve LV by means of a duct N1.

Inside the tank TL, the liquefied part falls towards the bottom of the tank TL, whereas the gaseous part remains above the liquefied part.

Hence, in the example of FIG. 4, the assembly GL comprises, besides the duct N1:

a duct N2, which connects the top of the tank TL to an inlet of the cooling device HE1 for the expanded component;

a duct N3, which connects an outlet of the cooling device HE1 for the expanded component to a further exhaust (not shown) of the vehicle VH.

Furthermore, in the example of FIG. 4, the assembly GL comprises:

a duct N4, which is connected to the supply line L6, so as to receive the compressed component, and to an inlet of the cooling device HE1 for the compressed component;

a duct N5, which connects an outlet of the cooling device HE1 to the inlet of the thermal expansion valve LV.

According to FIG. 4, the respective flows of the expanded component and of the compressed component have opposite directions through the cooling device HE1. In other words, the cooling device HE1 is configured to receive the flows in countercurrent.

Optionally, the line L6 is connected to the duct N4 by means of a separation device SD separating the compressed component, for example nitrogen, from the compressed air supplied to the assembly GL. The separation device SD is part of the assembly GL and is of a known type, so that it will not be described in detail.

Otherwise, the line L6 would be directly connected to the duct N4 and the compressed component would be defined by the compressed air supplied to the assembly GL.

It should be pointed out that the assembly GL is not provided with compression devices adapted to compress fluid in the gaseous state.

Figure 5:
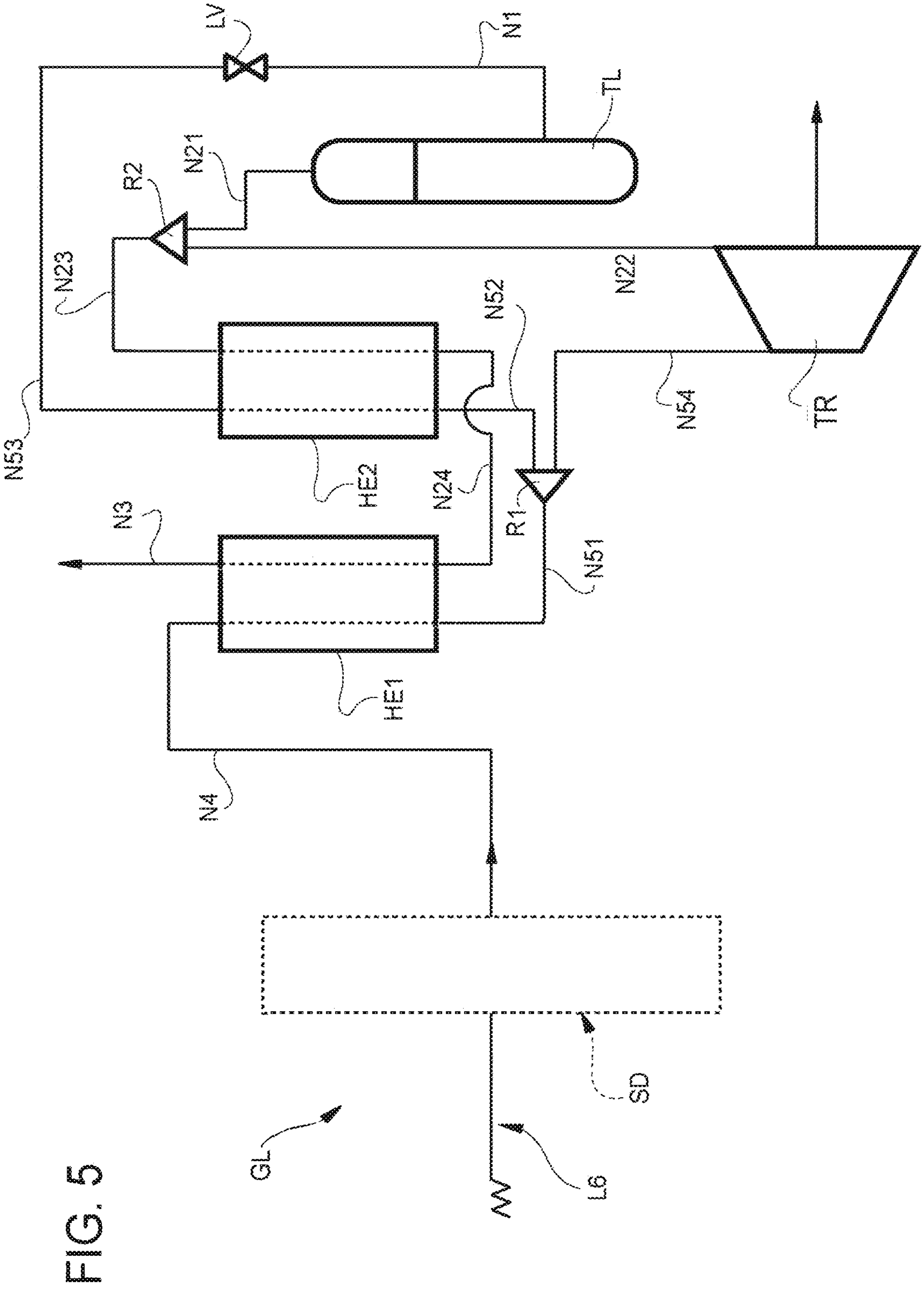
FIG. 5 shows a diagram of a variant of the gas liquefaction assembly of FIG. 4.

FIG. 5 shows a possible variant of the assembly GL with additional elements and with a different configuration of the ducts.

More precisely, in the variant of FIG. 5, the assembly GL comprises a further cooling device HE2, for example a heat exchanger, and a turbine TR.

Like the cooling device HE1, the cooling device HE2 is aimed at generating a thermal contact between the compressed component and the expanded component, so that the compressed component releases heat to the expanded component.

The cooling devices HE1, HE2 are configured in series, so that the compressed component flows at first through the device HE1 and then through the device HE2, whereas the expanded component follows a reverse path, flowing at first through the device HE2 and then through the device HE1. Hence, the cooling devices HE1, HE2 are configured to receive the flows in countercurrent.

The turbine TR is completely optional and is used to expand a portion of the compressed component with production of work, which can be exploited, for instance, to generate electrical energy. The portion expanding in the turbine TR cools down and, therefore, can be redirected to one of the cooling devices HE1, HE2 for the cooling of the compressed component.

Hence, in particular, instead of the duct N5, the assembly GL of the variant of FIG. 5 comprises:

- a flow dividing element R1, for example a three-way valve, having an inlet and two outlets;
- a duct N51, which connects the outlet of the cooling device HE1 for the compressed component to the inlet of the element R1;
- a duct N52, which connects one of the outlets of the element R1 to an inlet of the cooling device HE2 for the compressed component;
- a duct N53, which connects an outlet of the cooling device HE2 for the compressed component to the inlet of the thermal expansion valve LV;
- a duct N54, which connects another one of the outlets of the element R1 to an inlet of the turbine TR.

Furthermore, instead of the duct N2, the assembly GL of the variant of FIG. 5 comprises:

- a flow joining element R2, for example a three-way valve, having two inlets and an outlet;
- a duct N21, which connects the top of the tank TL to an inlet of the element R2;
- a duct N22, which connects an outlet of the turbine TR to another inlet of the element R2;
- a duct N23, which connects the outlet of the element R2 to an inlet of the cooling device HE2 for the expanded component;
- a duct N24, which connects an outlet of the cooling device HE2 for the expanded component to the inlet of the cooling device HE1 for the expanded component.

Clearly, in case of absence of the turbine TR, the elements R1, R2 as well as the ducts N54, N22 are absent as well. Furthermore, the ducts N51, N52 as well as the ducts N21, N23 would be joined to one another.

A further embodiment of an apparatus for producing liquefied gases will now be described with reference FIG. 2, where the apparatus is indicated by the reference symbol LGA'. The apparatus LGA' is similar to the apparatus LGA, so that only what distinguishes the former from the latter will be described in detail, Corresponding elements of the apparatuses LGA, LGA' will be indicated with the same reference symbols.

The apparatus LGA' includes the engine ICE, the flow circuit FC' and the assembly GL.

In the apparatus LGA', the compression of the air to be supplied to the assembly GL is carried out at least inside the cylinders CY, possibly in addition to the preliminary compression performed by the turbocharger TC, whose presence in the flow circuit FC' is optional.

Figure 2:
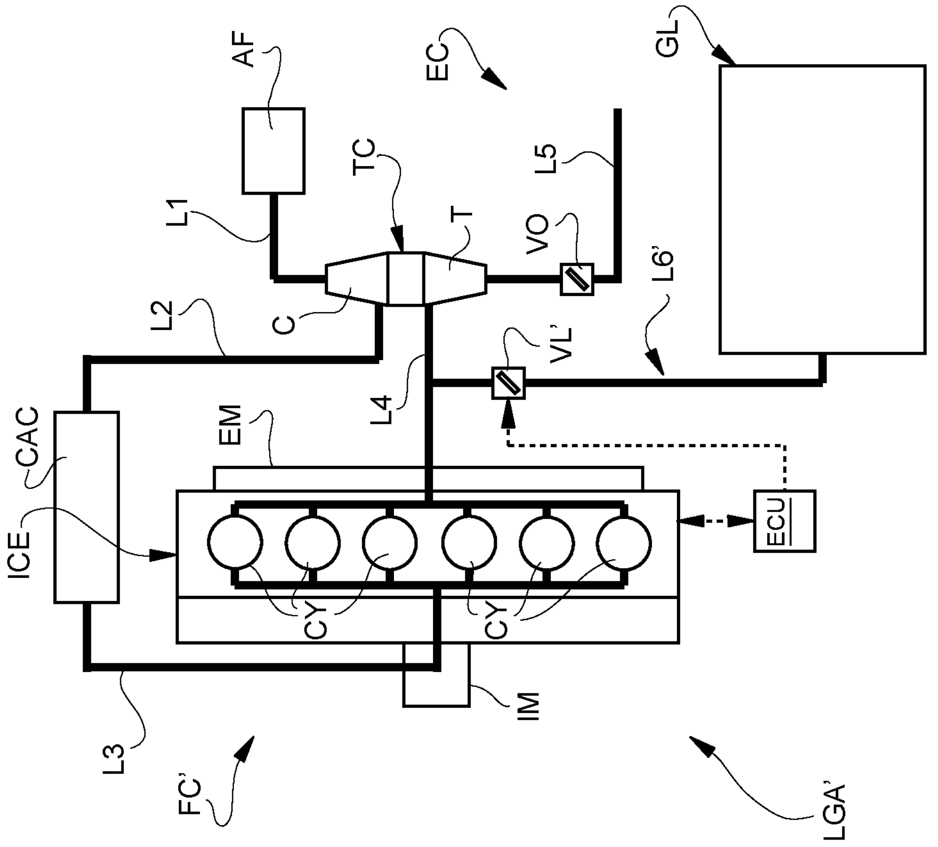
FIG. 2 is a diagram of a second embodiment of an apparatus for producing liquefied gases according to the invention.

Indeed, instead of the supply line L6, the apparatus LGA' comprises a similar supply line L6', which joins the flow circuit FC' in the area of a point downstream of the cylinders CY, conveniently between the exhaust manifold EM and the turbine portion T, the exhaust manifold EM being included as shown in FIG. 2.

The supply line L6' comprises a flow regulation device VL' having the same function as the corresponding flow regulation device VL. The control unit ECU, which preferably is part of the apparatus LGA', is connected to the device VL' and controls the device VL' in a way that is similar to the control of the device VL.

More precisely, the device VL' is controlled so as to enable a compressed air flow towards the assembly GL only when the injection of fuel into the cylinders CY is inhibited, namely when, for example, the engine ICE operates under engine brake conditions.

In this way, the flow circuit FC' substantially conveys compressed air downstream of the cylinders CY, so that the assembly GL receives compressed air instead of exhaust gases.

Optionally, the supply line L6' could also include a further filter, which is not shown, to eliminate impurities such as, for example, traces of lubricant oil or sediments inside the cylinders CY.

If necessary, when the device VL' allows air to flow towards the assembly GL, the control unit ECU could control the exhaust valves (not shown) normally associated with the cylinders CY so as to cause them to open during or at the end of the compression stroke, before the air can expand in the cylinders CY.

In the apparatus LGA', the assembly would hence receive compressed air at a pressure that is greater than the one of the compressed air received in the apparatus LGA, Indeed, the compression action of the cylinders CY would add to the compression action of the turbocharger TC.

A further embodiment of an apparatus for producing liquefied gases will now be described with reference FIG. 3, where the apparatus is indicated by the reference symbol LGA". The apparatus LGA" is similar to the apparatuses LGA, LGA', so that only what distinguishes the former from the latter will be described in detail. Corresponding elements of the apparatuses LGA, LGA' and LGA" will be indicated with the same reference symbols.

The apparatus LGA" comprises, instead of the engine ICE, a split-cycle internal combustion engine ICE". For example, the engine ICE" is known.

Similarly to the engine ICE, the engine ICE" comprises an intake manifold IM", an exhaust manifold EM" and a plurality of cylinders CY".

The cylinders CY", in turn, comprise a plurality of compression cylinders CYC" and a plurality of expansion cylinders CYE".

In the operation of the engine ICE", the compression cylinders CYC" suck air from the intake manifold IM", which is compressed inside them, whereas the expansion cylinders CYE" receive compressed air from the compression cylinders CYC". The fuel is injected only into the expansion cylinders CYE", where the both the combustion and the expansion of the air-fuel mixture take place.

The expansion cylinders CYE" communicate with the exhaust manifold EM", so that the latter receives the exhaust gases discharged by the expansion cylinders CYE".

Figure 3:
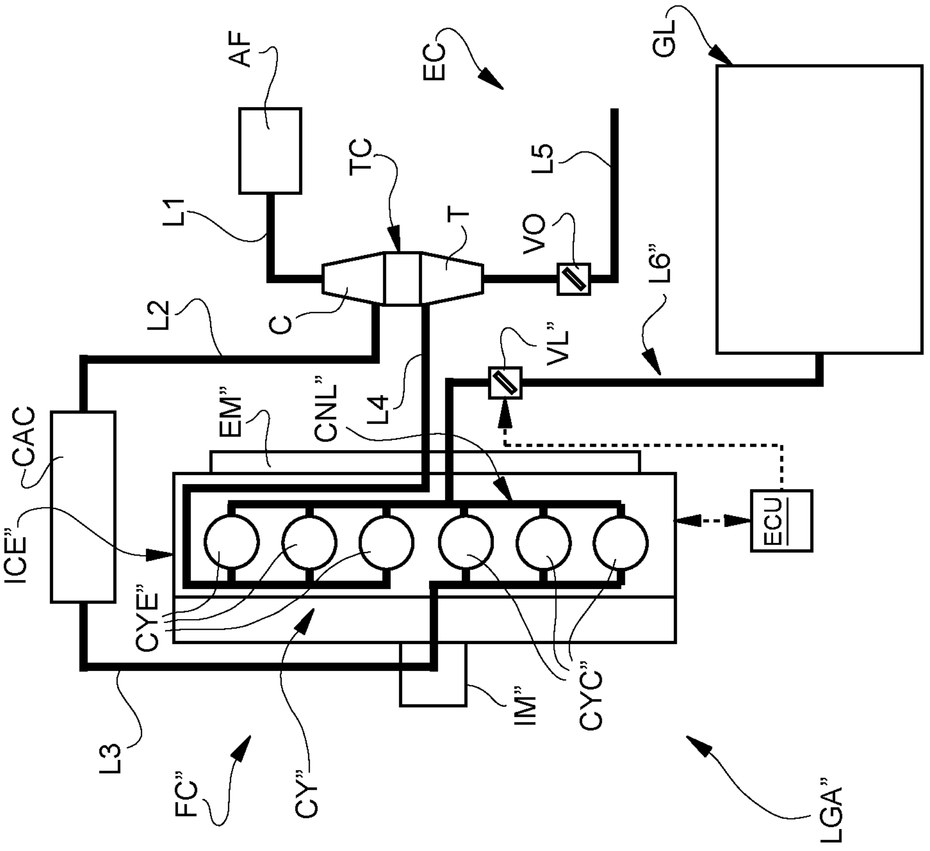
FIG. 3 is a diagram of a third embodiment of an apparatus for producing liquefied gases according to the invention.

In order to connect the compression cylinders CYC" to the expansion cylinders CYE", the engine ICE" comprises a connection line CNL", which has, for example, a plurality of ducts schematically shown in FIG. 3.

Furthermore, the apparatus LGA" comprises a flow circuit FC", which differs from the flow circuit FC only in that it comprises the intake manifold IM", the exhaust manifold EM" and the cylinders CY' instead of the intake manifold IM, the exhaust manifold EM and the cylinders CY and in that it comprises, in addition, the connection line CNL".

Furthermore, the apparatus LGA" includes the assembly GL. As already explained for the apparatus LGA', the presence of the turbocharger TC in the flow circuit FC" is optional.

Indeed, instead of the supply line L6, the apparatus LGA" comprises a similar supply line L6", which joins the flow circuit FC" in the area of a point downstream of the Compression cylinders CYC", conveniently belonging to the connection line CNL', namely between the compression cylinders CYC" and the expansion cylinders CYE".

Hence, in the apparatus LGA", the compression of the air to be supplied to the assembly GL is carried out at least inside the cylinders CYC", possibly in addition to the preliminary compression performed by the turbocharger TC.

The supply line L6" comprises a flow regulation device VL" having the same function as the corresponding flow regulation devices VL, VL'. The control unit ECU, which preferably is part of the apparatus LGA", is connected to the device VL" and controls the latter in a way that is similar to the control of the corresponding devices.

The cylinders CYC" are exclusively dedicated to the compression of the air sucked by the intake manifold IM", so that the assembly GL receives, in the apparatus LGA", compressed air at a greater pressure than the one of the compressed air received in the apparatus LGA. Specifically, the compression action of the cylinders CY adds to the one of the turbocharger TC.

The operation of each one of the apparatuses LGA, LGA', LGA" defines a corresponding particular embodiment of the method according to the invention.

Owing to the above, the advantages of the apparatuses LGA, LGA', LGA" and of the method according to the invention are evident.

Indeed, liquefied gases can be produced in a vehicle VH when, for example, the internal combustion engine ICE or ICE" operates under engine brake conditions, without additional devices to compress air.

Unlike common gas liquefying apparatuses, the compressed air supplied to the assembly GL comes from the flow circuits FC, FC', FC", so that the assembly GL does not need a dedicated compressor of its own.

Hence, the assembly GL is more efficient than other known assemblies, as it does not absorb work in order to compress the gas to be liquefied.

The apparatuses LGA, LGA', LGA" have a simpler construction compared to other known apparatuses. Indeed, the absence of dedicated compressors in the assembly GL also implies the absence of mechanical connections between the assembly GL and the engines ICE and ICE" in order to provide work that can be absorbed by the assembly GL.

The liquefied gases produced on board the vehicle VH can have several advantageous uses. For example, liquefied air can be used to supercharge the engine ICE or ICE". Liquefied air can also be injected into the cylinders CY or into the expansion cylinders CYE", as its beneficial effect in the combustion as temperature reducer and, hence, pollutant reducer, specifically in case of thermal Nox, is well known.

Furthermore, liquefied gases are powerful cooling means when used as heat exchange fluids. For example, liquefied air can be used to condition the inner compartments of the vehicle VH, in particular in case of refrigerated transportation, and to cool mechanical parts of the vehicle VH itself.

Liquefied gases can also be effectively used to cool the compression taking place in the cylinders CYC", so that the necessary compression work is reduced.

Moreover, the liquefied gases produced on board the vehicle VH, if they exceed the quantities needed by the vehicle VH itself, can be used on the outside of the vehicle VH for different uses.

Finally, the apparatuses LGA, LGA', LGA" and the method according to the invention can be subjected to changes and variants, which, though, do not go beyond the scope of protection set forth in the appended claims.

In particular, the embodiments can be combined with one another; for example, the engine ICE can always be replaced by the engine ICE" and vice versa. Similarly, each one of the lines L6, L6', L6" can properly be installed in each one of the circuits FC, FC', FC".

The turbocharger TC could be replaced by a different compressor, for example an electrically powered compressor.

The structure of the assembly GL could be different from the ones described and discussed in detail. In particular, there could be a different number of ducts, arranged in a different manner and connected to the various elements of the assembly GL differently.

The separation of the component to be liquefied from the compressed air could take place in a different area of the assembly GL, for example downstream of the cooling device HE1 or of the cooling device HE2.

The presence of cooling devices to cool the compressed component could not be necessary depending on the pressure of the compressed air supplied to the assembly GL, For similar reasons, further cooling devices could be provided and be configured, for example, in series so as to further decrease the temperature of the compressed air, depending on the pressure thereof.

The arrangement of the flow circuits FC, FC', FC" could be different from the one shown herein. Furthermore, elements such as the air filter AF or the heat exchanger CAC are not strictly necessary, even though evidently advantageous.

Moreover, the following examples are provided and listed in a numbered order, so that they can more easily be referred to.

1.—An example of a method for producing liquefied gases, preferably comprising the steps of:

i) providing an internal combustion engine (ICE; ICE"), which comprises at least one cylinder (CY; CYC") and an exhaust manifold (EM; EM");

ii) providing flow a circuit (FC; FC'; FC"), which comprises said cylinder (CY; CYC") and pneumatically connects an air inlet (AF) to the exhaust manifold (EM; EM");

iii) conveying air along the flow circuit (FC; FC'; FC") according to a flow direction from the air inlet (AF) towards the exhaust manifold (EM; EM");

iv) compressing the air along a portion (TC; CY; CYC") of the flow circuit (FC; FC'; FC"); and v) liquefying at least a gaseous component of the air compressed during step iv).

2.—The method according to example 1, wherein step v) comprises expanding the gaseous component through a thermal expansion valve (LV).

3.—The method according to example 1 or 2, wherein step v) further comprises cooling said compressed air or the gaseous component prior to the expansion through the thermal expansion valve (LV).

4.—The method according to any one of the examples from 1 to 3, wherein said compressed air for carrying out step v) is drawn from the flow circuit (FC) between the air inlet (AF) and an intake manifold (IM) of the internal combustion engine (ICE); step iv) being carried out by means of a supercharging compressor (TC).

5.—An example of an apparatus for producing liquefied gases (LGA; LGA'; LGA"), preferably comprising:

an internal combustion engine (ICE; ICE"), which comprises at least one cylinder (CY; CYC") and an exhaust manifold (EM; EM");

a flow circuit (FC; FC'; FC"), which comprises said cylinder (CY; CYC") and pneumatically connects an air inlet (AF) to the exhaust manifold (EM; EM"), so that air can be conveyed along the flow circuit (FC; FC'; FC") according to a flow direction from the air inlet towards the exhaust manifold (EM; EM");

compression means (TC; CY; CYC"), which are arranged in the area of a portion of the flow circuit (FC; FC'; FC") to compress the air conveyed therein;

liquefaction means (GL) for liquefying at least a gaseous component of the air compressed by the compression means (TC; CY; CYC"); and a supply line (L6; L6'; L6"), which is connected to the flow circuit (FC; FC'; FC") downstream of said portion, according to said flow direction, and is configured to supply the air compressed by the compression means (TC; CY; CYC") to the liquefaction means (GL).

6.—The apparatus according to example 5, wherein the liquefaction means (GL) comprise a thermal expansion valve (LV) for expanding the gaseous component.

7.—The apparatus according to example 5 or 6, wherein the compression means (TC; CY; CYC") comprise a supercharging compressor (TC), which is arranged between the air inlet (AF) and an intake manifold (IM; IM") of the internal combustion engine (ICE; ICE").

The invention claimed is:

1. A method for producing liquefied gases comprising the steps of:

i) providing an internal combustion engine that comprises at least one cylinder and an exhaust manifold;

ii) providing a flow circuit that comprises said at least one cylinder and pneumatically connects an inlet for air to the exhaust manifold;

iii) conveying the air along the flow circuit according to a direction of flow from the inlet for the air towards the exhaust manifold;

iv) compressing the air along a portion of the flow circuit upstream of the at least one cylinder using a compressor of a turbocharger that is directly coupled to the internal combustion engine; and v) liquefying a gaseous component of the air compressed during the step iv) wherein the gaseous component is liquefied due to the expansion of the compressed air by the compressor of the turbocharger through an expansion valve, during a braking condition and without the need to employ an additional compressor device, wherein the internal combustion engine is of a split cycle and comprises at least one expansion cylinder and at least one compression cylinder that form part of the flow circuit; said at least one cylinder being defined by the compression cylinder.

2. The method according to claim 1, wherein the step v) further comprises cooling said compressed air or the gaseous component prior to the expansion through the expansion valve.

3. The method according to claim 1, wherein said compressed air for carrying out the step v) is drawn from the flow circuit between the at least one compression cylinder and the at least one expansion cylinder.

4. The method according to claim 1, wherein said compressed air for carrying out step v) is drawn from the flow circuit when the internal combustion engine operates in an engine brake condition.

5. The method of claim 1, prior to liquifying the compressed air, transferring heat from the compressed air by an exposure of the compressed air counter to a counterflow of previously expanded air.

6. An apparatus for producing liquefied gases comprising:

an internal combustion engine that comprises at least one cylinder and an exhaust manifold;

a flow circuit that comprises said at least one cylinder and pneumatically connects an inlet for air to the exhaust manifold, so that it is possible to convey the air along the flow circuit according to a direction of flow from the inlet for the air towards the exhaust manifold;

a turbocharger that is directly coupled to the internal combustion engine, the turbocharger comprising a compressor arranged at a portion of the flow circuit for compressing the air conveyed therein;

a liquefaction assembly adapted for liquefying a gaseous component of the air compressed by the compressor of the turbocharger, the liquefaction assembly comprising an expansion valve, wherein the gaseous component is liquefied due to the expansion of the compressed air through the expansion valve, during a braking condition and without the need to employ an additional compressor device; and a supply line connected to the flow circuit downstream of said portion, according to said direction of flow, and configured to supply the air compressed by the compressor of the turbocharger to the liquefaction assembly, wherein the internal combustion engine is of a split cycle and comprises at least one expansion cylinder and at least one compression cylinder that form part of the flow circuit; said at least one cylinder being defined by the compression cylinder.

7. The apparatus according to claim 6, wherein the supply line comprises a flow regulation device controllable to enable or prevent flows of gas from the flow circuit towards the liquefaction assembly; the apparatus further comprising a control unit configured to set or identify an engine brake condition of the internal combustion engine and programmed to control the flow regulation device, so that this enables a flow of compressed air towards the liquefaction assembly, when the engine brake condition has been set or identified.

8. A method for producing liquefied gases comprising the steps of:

providing a split cycle internal combustion engine that comprises at least one compression cylinder, at least one expansion cylinder, and an exhaust manifold;

providing a flow circuit that comprises said at least one compression cylinder and pneumatically connects an inlet for air to the exhaust manifold through at least said at least one compression cylinder:

conveying the air along the flow circuit according to a direction of flow from the inlet for the air towards the exhaust manifold through at least said at least one compression cylinder;

compressing the air along a portion of the flow circuit upstream of the at least one compression cylinder;

liquefying a first gaseous component of the air compressed by a compressor of a turbocharger, during a braking condition and without the need to employ an additional compressor device; and combusting a second gaseous component of the air compressed in said at least one expansion cylinder.

9. The method of claim 8, prior to liquifying the compressed air, transferring heat from the compressed air by an exposure of the compressed air counter to a counterflow of previously expanded air.

* * * * *